United States Patent

Powers et al.

[11] 4,036,301
[45] July 19, 1977

[54] PROCESS AND COMPOSITION FOR CEMENTING CASING IN A WELL

[75] Inventors: Charles A. Powers; George B. Holman, both of Tulsa; Robert C. Smith, Inola, all of Okla.

[73] Assignee: Standard Oil Company (Indiana), Chicago, Ill.

[21] Appl. No.: 704,717

[22] Filed: July 12, 1976

Related U.S. Application Data

[60] Continuation-in-part of Ser. No. 518,543, Oct. 29, 1974, abandoned, which is a division of Ser. No. 561,518, March 24, 1975, abandoned.

[51] Int. Cl.² .................................................. E21B 33/14
[52] U.S. Cl. ........................................ 166/293; 106/96; 106/315; 166/295
[58] Field of Search ..................... 166/293, 295, 292; 106/96, 90, 76, 116, 315, 308 Q

[56] References Cited

U.S. PATENT DOCUMENTS

| | | | |
|---|---|---|---|
| 2,621,132 | 12/1952 | Saal | 106/96 X |
| 2,848,340 | 8/1958 | Haldas | 166/293 X |
| 2,985,239 | 5/1961 | Shell | 166/293 |
| 3,028,913 | 4/1962 | Armentrout | 166/292 |
| 3,368,623 | 2/1968 | Carter et al. | 166/293 X |
| 3,420,299 | 1/1969 | Cloud | 166/292 |
| 3,804,058 | 4/1974 | Messenger | 166/293 X |
| 3,873,332 | 3/1975 | McCreight | 106/116 X |

OTHER PUBLICATIONS

Taylor, W. H., Concrete Technology and Practice, (1965), published by American Elsevier Co., Inc., N. Y., pp. 185, 357 and 612.

*Primary Examiner*—Stephen J. Novosad
*Attorney, Agent, or Firm*—Robert B. Stevenson; Arthur McIlroy

[57] ABSTRACT

A process for reducing the waiting-on-cement (WOC) time associated with the cementing of a casing string in an oil well involving the specific improvement of pumping into the well a highly retarded cement slurry containing a dispersed encapsulated accelerator, such as calcium chloride or anhydrous sodium metasilicate, wherein the encapsulating material is specifically selected such that it will melt at a temperature above the bottom-hole circulating temperature but below the bottomhole static temperature of the well to be cemented. Petroleum-derived waxes and petroleum-derived waxes in combination with vinyl resins, such as wax-compatible copolymers of ethylene and vinyl acetate, are particularly suitable as the meltable encapsulating material exhibiting excellent strength and abrasion resistance as well as serving as a moisture barrier. The improved process is particularly useful in cementing deep hot wells.

13 Claims, 5 Drawing Figures

PROCESS AND COMPOSITION FOR CEMENTING CASING IN A WELL

CROSS-REFERENCES TO RELATED APPLICATIONS

This is a continuation-in-part of a parent case, Ser. No. 518,543, which was filed on Oct. 29, 1974, and a divisional case of this parent, Ser. No. 561,518, which was filed on Mar. 24, 1975, both of which are now abandoned in favor of this application.

BACKGROUND OF THE INVENTION

During the course of drilling an oil well, it is necessary at various intervals to lower casing or pipe into the hole and cement it in place. The cementing operation is accomplished by pumping a slurry down the pipe and up the annulus between the casing and the hole. Depending on the particular well and the assoiacted circumstances, it is quite common to use one or more of a variety of additives to alleviate specific problems or achieve desired results. Thus, it is known and well documented in the art that additives can be used to either increase or decrease the density of the slurry; certain additives can be used to retard the thickening time, hence increasing the pumpability time; other additives can be used to accelerate the setting, and still others are used to expand the set cement during cure. Furthermore, various processes and methods of cementing have been perfected to achieve specific results, such as the process disclosed in U.S. Pat. No. 3,420,299, wherein an expanding agent is released at a time corresponding to the onset of the exotherm associated with the setting of cement. However, prior to our invention, the use of certain types of additives has been considered to be mutually exclusive in that their effects are opposite in nature and their simultaneous use would be counter productive. Thus, a cement accelerator additive is not ordinarily used concurrently with a cement retarder. However, in cementing deep hot wells, such as found in the Gulf Coast area, the need for both types of additives becomes apparent. Because of the extreme depths and the high temperatures, the cement slurry must be highly retarded in order to insure sufficient time to pump the slurry down the casing and back up the annulus.

As a consequence of being highly retarded, the time required for slurry to gel and set is prolonged. The longer the time that the cement slurry remains in an ungelled or unset state after placement the greater the odds are that gas channeling will take place necessitating a subsequent cement squeeze step. Furthermore, the presence of the retarder will also slow down the hardening process after setting. Since it is necessary for the mechanical strength of the cement to increase to a minimum value before work in the well hole can be resumed, the so-called "wait-on-cement" time is inherently extended, which, in practice, means prolonged down time and increased expense. It is also known that using a highly retarded slurry results in a lowering of the ultimate tensile strength of the cement. Thus, in a number of deep hot wells where highly retarded cement slurries were used, WOC times of up to 72 hours were required and unset or green cement has been found after several days following the cementing operation.

To alleviate these problems, we have developed a process of incorporating a cement accelerator into a highly retarded slurry without influencing pumpability of the slurry, yet, shortly after the placement of the slurry at the bottom of a well hole, the accelerator additive will essentially promote a flash set.

SUMMARY OF THE INVENTION

We have discovered an improved method of cementing casing in a deep hot oil well comprising the steps of first pumping a highly retarded cement slurry containing a dispersed encapsulated accelerator down the casing and up the annulus between the casing and the bore wall. The encapsulating material coating the cement accelerator is selected such that it will melt at a temperature below the characteristic bottom-hole static temperature (BHST) of the particular well being cemented but will not melt at a temperature corresponding to the bottom-hole circulating temperature (BHCT, also referred to as the bottom-hole cementing temeprature). After placement, the cement slurry is held in a static noncirculating state such that the slurry temperature will approach the BHST. In doing so, the encapsulating material softens and/or melts, releasing the accelerator and inducing a rapid set of the cement. In this manner, the WOC time is significantly reduced, resulting in more efficient use of the well drilling equipment.

In one embodiment of our invention, a new process for cementing casing in a deep hot oil well is disclosed. In another embodiment of our invention, an improved cement slurry is used in cementing oil well casing.

The primary object of our invention is to reduce the WOC time when cementing casing in a deep hot oil or gas well. Another object is to create simultaneously in a single cement slurry the advantages of both the pressure of a cement retarder and a cement accelerator, while minimizing their associated disadvantages. Specifically, one object is to have a cement slurry that has sufficient pumpability time (highly retarded) such that it can be used in deep hot wells. Another object is to have that some cement slurry flash set shortly after placement, thus minimizing WOC time and gas channeling. An assoiacted object is to have the post-set curing process rapidly, thus minimizing the green cement problem and assuring high ultimate strength. The mere addition of our encapsulated accelerator to cement slurries as insurance against the formation of green cement will frequently justify the additional expense of the additive. This is particularly true in situations where the well has been exposed to cement retarding-type additive (such as drilling muds containing lignosulfonate and the like) which may later contaminate the subsequent cement job.

DESCRIPTION OF THE PREFERRED EMBODIMENT

The highly retarded cement slurries of our invention consist essentially of Portland cement, particularly those of class A through H, in combination with a minor amount of a chemical retarder, such as calcium lignosulfonates, organic acids, boric acid, sodium phosphates, potassium tartrate, and/or their mixtures. The API class J cements, with or without addition of chemical retarder, are also considered equivalent for the purposes of our invention. Various other additives, used for specific purposes, such as agents to either increase or decrease density, prevent lost circulation, and compensate for shrinkage, can also be present. The amount of retarder added can best be defined for purposes of this invention in terms of the desired pumpability time. Thus, for cementing deep hot wells, it is desirable to add sufficient retarder to the cement slurry such that the pumpability time (the time prior to the cement slurry exceeding 100 API units of consistency at temperatures characteric of the particular well) will be of sufficient duration to allow placement of the slurry in the particular well. Depending on the circumstances, such as temperature, pressure, depth, and flow rates, this pumpability time can be as low as two hours or as high as 6 or more hours. In the case of the preferred class of retarders additives containing lignosulfonate, a highly retarded cement slurry can be achieved by the addition of from about 0.1 to about 2.5 weight percent retarder.

The cement accelerators of our invention are common additives, well known in the art, including such accelerators as calcium chloride, sodium chloride, sodium silicate and their mixtures. The preferred accelerator is calcium chloride and/or anhydrous sodium metasilicate.

The quanity of the accelerator to be used corresponds closely to the known pumpability time as a function of concentration and temperatue. Thus, for the calcium chloride embodiment, good results are observed at fractional weight percents with a near flash set occurring at about 4 to 15 percent calcium chloride, depending on particle size and how well it is disperesed in the slurry. Similarly, for the anhydrous sodium metasilicate embodiment, significant acceleration occurs at concentration greater than 2% and flash set occurs at 5% $Na_2SiO_3$ even when the cement slurry was intentionally selected as a highly retarded slurry having practically unlimited thickening time (greater than 24 hours at 230° F) in the absence of accelerator. Since, in our invention, the accelerator is encapsulated and is released shortly after placement, the only limitation on the maximum amount used is the physical limitation on how much accelerator can be suspended in the slurry.

Figure 1:
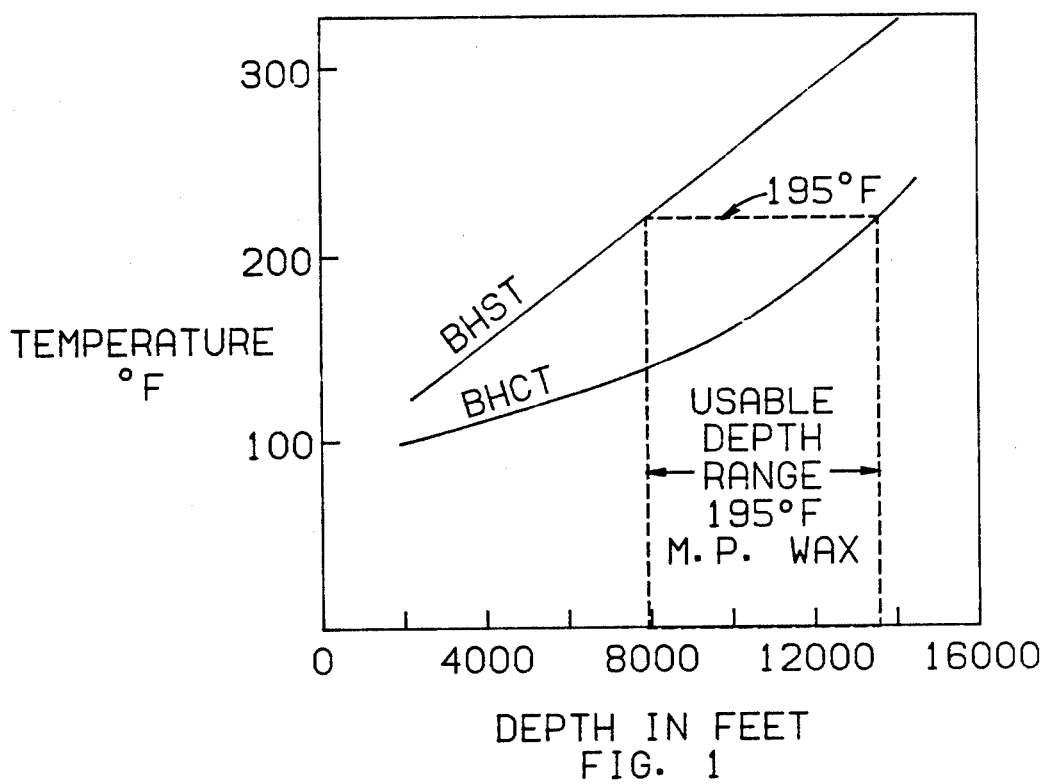
FIG. 1 of the drawing is a plot of the bottom-hole static temperature and a plot of the bottom-hole circulating temperature of a deep hot oil well in degrees Fahrenheit as a function of the depth expressed in feet. The superimposed broken lines indicate that our encapsulted accelerator, having a coating that melts at 195° F, would have an aniticipated useful range from about 8000 to about 13,500 feet.

The encapsulating materials useful in our invention include a variety of materials, all of which possess certain characteristic properties. In particular, they are capable of forming a thin moisture-proof barrier when coated onto the cement accelerator. Additionally, the coating must soften and/or melt when subjected to the static temperature of the well being cemented, thus releasing the accelerator to flash set the cement slurry. Also, the coating must remain sufficiently intact during the pumping and circulating process such that no significant increase in consistency of slurry is induced. Thus, certain information regarding the casing to be cemented must be considered in order to select the proper encapsulated additive. As illustrated in FIG. 1 of the drawing, by plotting both the BHST and the BHCT for the well of interest as a function of depth on a single graph, the desired melting temperature of the coating can be determined. This is accomplished by requiring that the entire depth range to be cemented fall between the two curves.

The preferred encapsulating materials of our invention are categorically organic waxes, including the waxlike resinous materials. These include the naturally occurring waxes composed of organic esters, higher fatty acids and alcohols, hydrocarbons, and their mixtures, the paraffin waxes either isolated from or derived from petroleum, the synthetic waxes including acrylic and vinyl polymers, polyolefins, and fractionated polyolefins, as well as acrylic, olefinic or vinyl modified natural waxes and their mixtures. The petroleum-derived paraffin waxes are of particular utility either by themselves or in combination with other wax compatible polymers and copolymers forming compositions commonly recognized as hot melt adhesives and paper coatings. In particular, a petroleum-derived wax in combination with vinyl resins, such as copolymers of ethylene and vinylacetate, are suitable as meltable encapsulating material exhibiting excellent strength and abrasion resistance as well as serving as a moisture barrier.

The coating or encapsulating process can be any of the well known methods, such as solvent deposition, spray coating, electrostatic coating, condensation, and the like, providing the method results in a uniform layer covering the entire external surface of the accelerator. Preferably, the accelerator should be of particulate or granular form capable of passing through a 20- to 40-mesh screen and retained on a 60-mesh screen. However, powders capable of passing through a 60-mesh screen are considered equivalent for purposes of this invention. For ease of coating, a spherical shaped particle is preferred. When coating calcium chloride, because of its hygroscopic nature, dry conditins must be maintained. The Wurster hot air encapsulating process is particularly useful.

Although our invention will find its greatest utility in cementing deep hot oil wells having BHST of from about 260° F to about 400° F, the basic process is generally applicable to other types of wells including water wells, geothermal wells, and the like, Generally, all of the advantages of the process will be realized in cementing any well having a BHST of 200°, or greater.

Thus, as seen in FIG. 1, this 200° F BHST will correspond to coating materials having melting points or softening points of approximately 125° F, or greater, and be useful at depths from about 8,000 feet to about 13,500 feet or deeper. Yet, FIG. 1 further indicates that the advantages of our invention can also be achieved at a BHST as low as about 138° F when coatings meltable at about 98° F are employed at a depth of about 4,000 feet. In the case of oil and gas wells, static temperatures as high as 450° F have been encountered, while some geothermal wells have been reported as high as 795° F. In the case of these ultra hot wells, the coating materials having correspondingly higher melting and sofening points are selected.

Having thus described the details of the preferred embodiment, the following examples plus controls are presented as comparative data illustrating the improved behavior of our invention under controlled laboratory conditions, and as such should not be interpreted as being unduly limiting.

EXAMPLE 1

Figure 2:
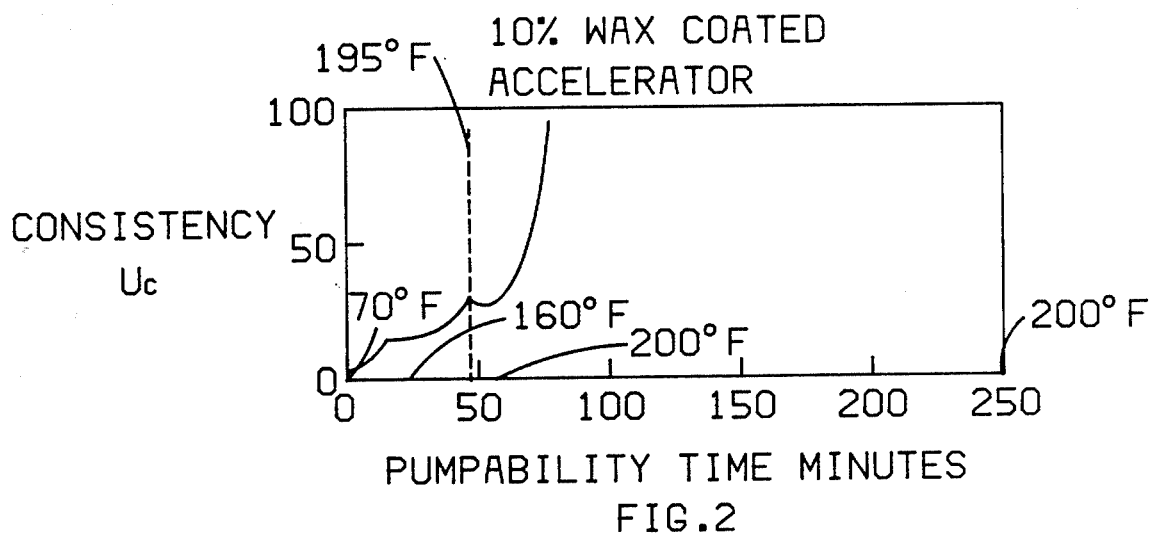
FIG. 2 and FIG. 3 of the drawing show comparative behaviors of a highly retarded cement slurry with and without a wax-coated $CaCl_2$ accelerator.
Figure 3:
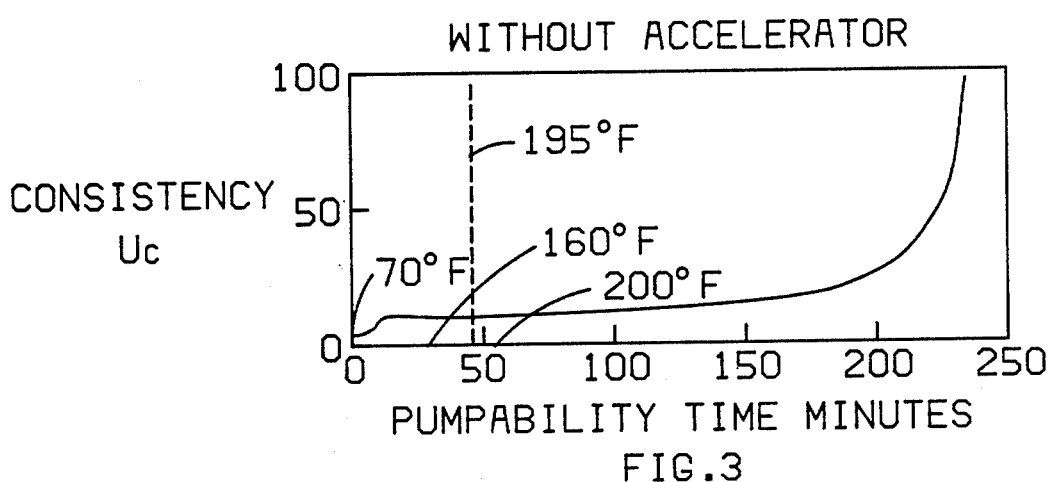

Granular calcium chloride capable of passing through a 30-mesh screen was coated to the extent of 10% by weight with a petroleum-derived paraffinic wax (Petrolite C-1035), having a melting point of 195° F. The Wurster hot air process for coating material was employed. Careful testing determined that the coating did have some holidays (less than 100% encapsulation), which would lead to some premature reaction of the calcium chloride. 795 grams of a class G Portland cement (sold as Permenete G), 2.4 grams of a lignosulfonate retarder (sold as additive HR12), and 350 ml of water were placed in a Warning blender and mixed for 35 seconds. After the blending, 79.5 grams of the encapsulated $CaCl_2$ were stirred into the slurry by use of a spatula. The resulting cement time tester. The recorded consistency, as a function of time, is presented in FIG. 2 of the drawing. In a similar manner, a sample of the cement slurry without the accelerator was tested and the results are shown in FIG. 3. Each test was performed by stating at 70° F and rapidly increasing the temperature of 200° F under constant stirring. The temperature was maintained at the 200° F level until the consistency of the slurry reached 100 API units, at which time the slurry was considered not pumpable and the test terminated. As indicated in the data, the cement slurry without the accelerator has a normal thickening time of 4 hours at 200° F. In contrast, the pumpability limit was reached in 77 minutes in the case of 10% encapsulated calcium chloride. Furthermore, shortly after reaching the 200° F temperature, the consistency appears to asymptotically approach infinity, indicating a flash set of the cement, thus establishing that an encapsulataed accelerator would in fact shorten the WOC time after placement.

EXAMPLE II

Granulated anhydrous sodium metasilicate ($Na_2SiO_3$). capable of passing through a 20-mesh screen and being trapped on a 60-mesh screen, was uniformly coated with a mixture of a petroleum-derived paraffinic wax and ethylene vinylacetate copolymer by the Wurster coating process; see U.S. Pats. Nos. 2,648,609 and 2,799,241. The coating process involved the use of a hard coating solution made by dissolving 90 grams of a hard microcrystalline wax (Petrolite's Bareco C-1035 having a melting point of 199.5° F, ASTM D-127) and 60 grams of an ethylene vinylacetate copolymer (Du Pont's Elvax 420 being approximately 17% to 19% vinylacetate with a softening point, ring and ball, of 210° F, ASTM E-28) in each liter of trichloroethylene solvent. Solvent removal was accomplished by performing the coating process at 140° to 150° F, which resulted in a uniform layer of the wax/ethylene vinylacetate mixture being deposited on the granules. This coating consituted 30% by weight of the resulting encapsulated accelerator and exhibited a softening and melting point of 188° to 190° F.

Figure 4:
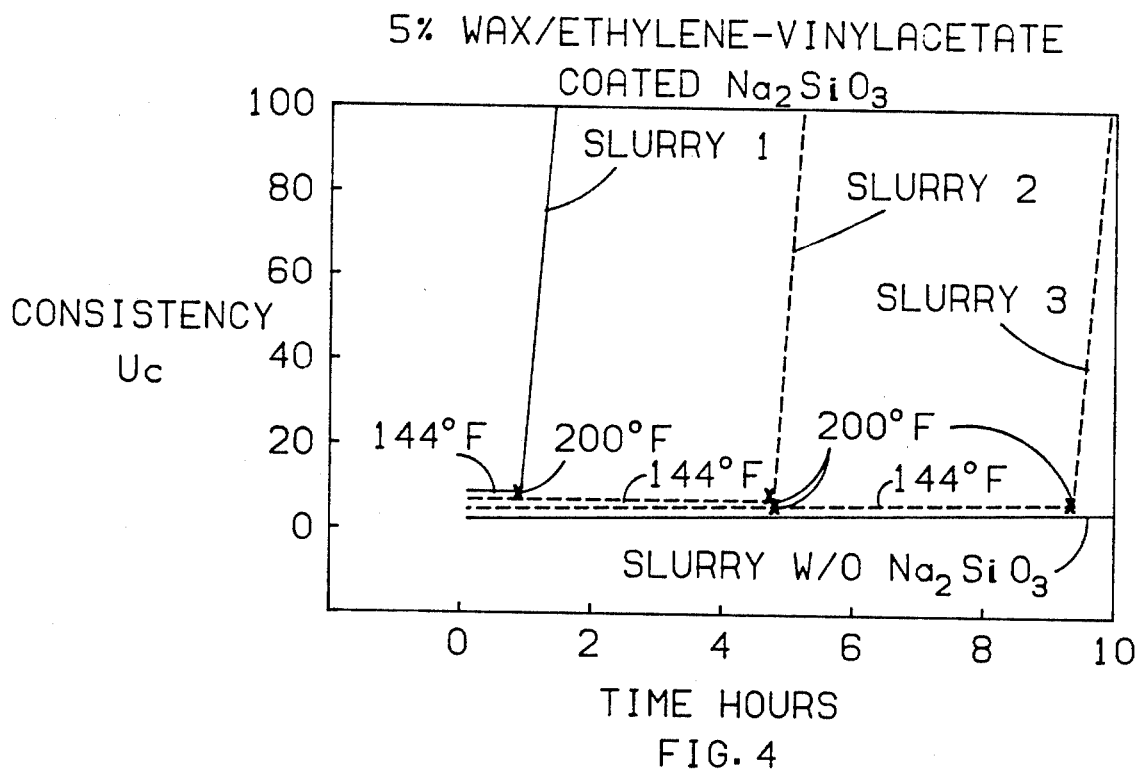
FIG. 4 of the drawing illustrates behaviors of a highly retarded cement slurry with and without a wax/ethylene vinylacetate coated $Na_2SiO_3$ accelerator.

A highly retarded API class H cement slurry was prepared using the encapsulated accelerator by first dry blending 7.14 parts by weight (5 parts $Na_2SiO_3$) coated accelertor and 1 part by weight HR-12 lignosulfonate retarder per 100 parts of dry class H (Lonestar) cement. To the resulting mixture was added 38 parts by weight water per 100 parts cement. To determine the effectiveness of the coated accelerator in the cement slurry, there thickening time tests (API RP-10B, "Testing Oilwell Cements and Cement Additives," January 1974) were performed using approximately 500 ml samples of the cement slurry. The tests were designed and carried out to simulate an API 10,000-foot casing schedule at a bottom-hole circulating temperature of 144° F. The consistency of each run is plotted as a function of time in FIG. 4 of the drawing. The three slurries were maintained at 144° F for approximately 1 hour, 5hours, and 10 hours, respectively, at which times the temperatures were intentionally raised to 200° F, indicated as X's on FIG. 4, causing the coating to soften and melt. Upon reaching 200° F, the sodium silicate was exposed to the slurries, causing the cement to set in about 10 minutes. For comparison, a sample of the cement to set in about 10 minutes. For comparison,a sample of the cement slurry less the sodium silicate accelerator was tested in an identical fashion with a temperature rise from 144° to 200° F after approximately 5 hours with no detectable change in consistency. Even after 24 hours at 230° F, the control slurry failed to set, indicative of its highly retarded state. Additional thickening time tests were conducted on the retarded slurry containing 5% coated accelerator at other temperatures. The results of these tests are summarized in the following Table I.

TABLE I

| THICKENING TIME TEST | |
|---|---|
| Temperature | Time Required to Achieve 100 Uc |
| 173–175° F | 10 hours 40 minutes |
| 180–182° F | 6 hours |
| 185–187° F | 3 hours 30 minutes |

These data indicate that the coating apparently softens at temperatures near 175° to 180° F making it susceptible to removal by physical abrasion.

In order to determine the durability of the coating under simulated field conditions, three circulation tests involving two cement slurries containing the coated accelerator and one without accelerator were performed. The tests were conducted using an apparatus illustrated in FIG. 5 of the drawing. An API Class G cement slurry containing 1 part of HR-12 retarder and 44 parts by weight dry cement was used. 7.14 parts by weight of the above-described coated $Na_2SiO_3$ was added to tests 1 and 2. Each of the first two samples was continuously circulated through the apparatus of FIG. 5 until a consistency of 100 $U_c$ was achieved. As illustrated, a double-acting duplex steam pump which was equipped with poppet valves with steel-to-steel seats was used to pump the cement slurry through a 20-foot long 1.5 inch pipe to the inlet of a simulated oilwell annulus involving an inner 1.5 inch pipe and an outer concentrically positioned 4 inch pipe, 5 feet long. The entire annulus model was immersed in an oil bath which was maintained at 144° F. However, the slurry temperature during circulation ranged from 97° to 122° F. The cement slurry being tested flowed down the inner pipe of the annulus model and then back up the outer annulus formed by the concentrically placed outer pipe. The cement slurry was then returned to the inlet of the pump for further recirculation of the same slurry. The third sample (no accelerator) used the apparatus of FIG. 5 except no annulus model was present. In each case, the flow rate through the apparatus was held between 2 and 2.25 BPM with 15 psi backpressure on the pump discharge. Table II presents the results of the three circulation tests.

TABLE II
PUMP CIRCULATION TEST

| Sample | Concentration of Coated Accelerator, %* | Circulation Time to 100 $U_c$ hours | No. of Passes through Pump |
|---|---|---|---|
| 1 | 5 | 1.75 | 798 |
| 2 | 5 | 2.0 | 927 |
| 3 | 0 | 3.67 | 1672 |

It can be concluded from Table II that the coating on the encapsulated accelerator is sufficiently durable to be used in a commerical cement job. This is particularly obvious in that a commmerical placement of cement in a well usually involves a single pass through a pump while the above test was much more severe. It should also be noted that the accelerator-free sample has a circulating time of 3.67 hours in this test but exhibits a thickening time (API RP-10B) greater than 24 hours at 230° F. Therefore, the accelerating effects illustrated in Table II are probably due to a combination of factors: (1) failure of some of the coating releasing the accelerator, and (2) the shearing action of the pump directly on the slurry.

To isolate the effect of the pump shearing action from the failure to the coating, periodic samples of the slurry containing the coated accelerator were withdrawn from the pump suction tank during the circulation test. These samples were subjected to be standard thickening time test on the atmospheric pressure consistometer. Table III presents the thickening times remaining at 144° F for the four samples withdrawn during the pump circulation test.

TABLE III
THICKENING TIMES DURING PUMP CIRCULATION TEST

| No. of Passes through Pump | Circulation Time, through Pump, minutes | Thickening Time to 100 $U_c$ at 144° F, hours |
|---|---|---|
| 1 | 10 (sec) | 26+ |
| 198 | 26 | 26+ |
| 397 | 52 | 26+ |
| 627 | 82 | 18 |

The data suggest that no significant amount of accelerator has been exposed to the slurry, otherwise much shorter thickening times would have been observed. The accelerating effect noted in the pump circulation test can be attributed almost entirely to the severe shearing action of the pump. The durability of the coated accelerator is sufficient for commerical applications.

To further evaluate the durability of the coating on the accelerator, a sample of the slurry one pass through the pump circualation test was subjected to a long-term abrasion test. A cylinder 3 inches ID by 4.75 inches long was filled with 300 cc of slurry and rolled at 52 rpm for 48 hours at room temperature. At the end of this time, the sample was still a slurry of low consistency. During the 48 hours, the slurry has contacted 46,000 square feet of surface, which is equivalent to contacting 34,000 feet of 5.5 inch casing.

Figure 5:
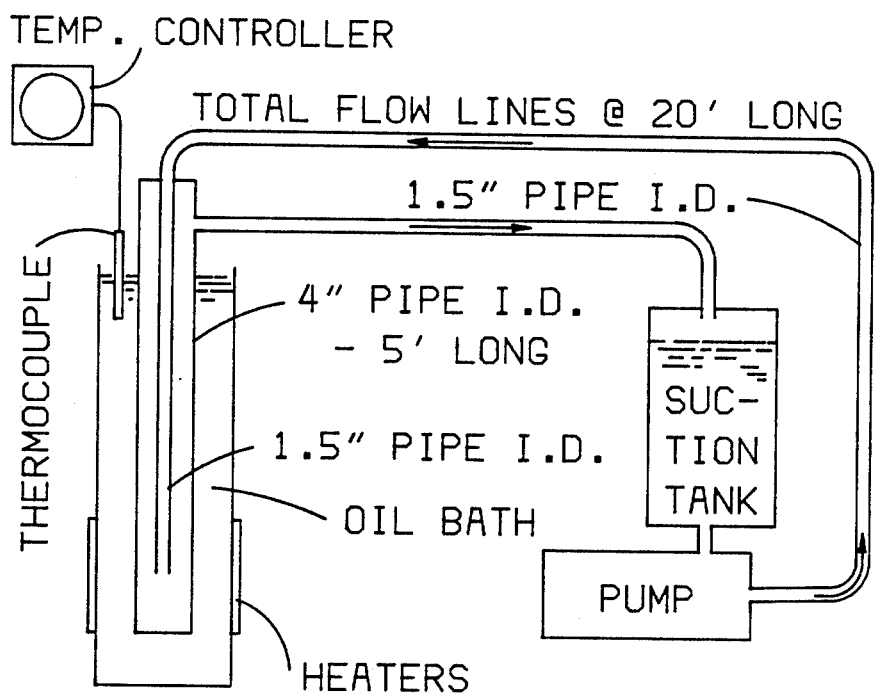
FIG. 5 of the drawing illustrates a test apparatus for repeatedly circulating a cement slurry through a cement pump and simulated well casing annulus.

In order to test the shear bond strength developed between the set cement and the well casing when our encapsulated accelerator is used, the second sample employed in the pump circulation test was allowed to set up in the annulus between the two concentric pipes at the end of the second circulation test. In preparation for this measurement, the inner pipe of the annulus model was sandblasted prior to the pump circulation test. At the end of the second pump circulation test, the annulus model was shut-in and the temperature of the slurry in the annulus was raised to 230° F and held there for 24 hours. The model was then allowed to cool 5 days, at which time it was cut into 8 6-inch sections. Each section was tested by holding the outer pipe stationary while applying an increasing force to the inner pipe until movement occurs. This force divided by the contact are between pipe and cement is termed the mechanical shear bond in psi and is recorded in Table IV. The resulting range of 177 to 493 psi are considered excellent values. The higher values at the bottom of the pipe are probably due to higher curing temperature at the bottom. As illustrated in FIG. 5, the 12-inch heaters are placed near the bottom while the temperature was controlled with a thermocouple placed near the top of the oil bath.

TABLE IV
SHEAR BOND TESTS

| Sample | Shear Bond, psi |
|---|---|
| 1 "Top" | 177 |
| 2 | 135 |
| 3 | 222 |
| 4 | 307 |
| 5 | 381 |
| 6 | 425 |
| 7 | 468 |
| 8 "Bottom" | 493 |
| Average | 326 |

In order to determine the WOC time associated with the accelerated slurries, an API Class H cement slurry containing 1 part by weight HR-12 retarder and 38 parts by weight water per 100 parts by weight dry cement was prepared and divided into three portions. To one portion was added 5 parts by weight uncoated $Na_2SiO_3$ per 100 parts dry cement. To another portion was added 7.14 parts by weight of the previously described coated $Na_2SiO_3$ per 100 parts by weight dry cement. The third portion was used without any accelerator. a series of tensile stength speciwere prepared using the various cement slurries. Each specimen was prepared by pouring the respective slurry into a mold shape much like a "dog bone," being 1 inch thick and 3 inches long with a 1-inch cross-sectional area. The molds containing the slurry were cured in a water bath which began at room temperature and was raised to 230° F at 3000 psi in 4 hours (API RP-10B) to simulate downhole conditions. After curing for 8, 24, and 40 hours, respective specimens were removed and subjected to increasing tension until failure occurred. The average maximum force for three specimens of each slurry is recorded in Table V as the tensile strength of the resulting cement.

TABLE V
STRENGTH DEVELOPMENT

| | Tensile Strength, psi | | |
|---|---|---|---|
| Age, Hours | 0% $Na_2SiO3$ | 5% Coated $Na_2SiO3$ | 5% Uncoated $Na_2SiO_3$ |
| 8 | 0 | 203 | 190 |
| 24 | 0 | 295 | 204 |
| 40 | 294 | Not determined | Not determined |

The slurry containing the coated accelerator has almost as much tensile strength in eight hours as the retared slurry has in 40 hours. This represents a major improvement in shortening WOC time, yet this slurry retains the unlimited pumability character of a retarded slurry without accelerator.

We claim:

1. A process of cementing casing in a deep hot well comprising the steps of:
   a. pumping a highly retarded cement slurry down said casing whereby said slurry will be forced up the annulus between said casing and the well bore wall wherein said highly retarded slurry contains a dispersed accelerator, said accelerator being encapsulated with a material capable of melting at a temperature below the bottom-hole static temperature of said well but not capable of melting at a temperature corresponding to the bottom-hole circulating temperature, and
   b. holding the cement slurry in a noncirculating static state at the desired level in said well such that said encapsulating material will melt releasing the accelerator and induce a flash set of said cement.

2. A process of claim 1 wherein encapsulating material is selected such that its melting point is between 125° and 450° F.

3. A process of claim 2 wherein the encapsulating material is an organic wax.

4. A process of claim 3 wherein the accelerator is selected from the group consisting of calcium and anhydrous sodium metasilicate.

5. A process of claim 1 wherein the accelerator is selected from a group consisting of calcium chloride, sodium chloride and sodium silicate.

6. An oil-well cement slurry for cementing in a well containing an effective amount up to about 15 percent by weight of an encapsulated cement accelerator wherein the encapsulating material covers the entire external surface of the accelerator, isolating said cement accelerator from said oil-well cement slurry and wherein said encapsulating material is capable of melting at a temperature below the bottom-hole static temperature of an oil or gas well to be cemented but not capable of melting at a temperature corresponding to the bottom-hole circulating temperature of said well, whereby, after placement, the cement slurry is held in a static moncirculating state such that the slurry temperature causes the encapsulating material to release the accelerator which induces a rapid set of the cement.

7. A cement slurry of claim 6 wherein said slurry is highly retarded.

8. A cement slurry of claim 7 wherein said encapsulated accelerator is calcium chloride coated with an organic wax.

9. A cement slurry of claim 7 wherein said encapulsated accelerator is anhydrous sodium metasilicate coated with an organic wax.

10. A cement slurry of claim 9 wherein said organic wax is comprised of a petroleum-derived paraffinic wax and an ethylene vinylacetate copolymer.

11. A method of preserving the desirable short wait-on-cement time characteristic of an accelerated cement slurry in cementing applications, wherein external retarder-type contamination is anticipated, involving the specific improvement of adding to the cement slurry, prior to placement, an encapsulated accelerator having a coated which will soften and melt at the temperatures characteristic of the cement placement, placing said cement slurry with said encapsulated accelerator and holding said encapsulated accelerator in place such that said coating softens and melts, releasing said accelerator which promotes a rapid set of said cement slurry.

12. A method of claim 11 wherein said accelerator is anhydrous sodium metasilicate and said coating is selected from the group consisting of petroleum-derived paraffinic wax and a mixture of petroleum-derived paraffinic wax with an ethylene vinylacetate copolymer.

13. A cement slurry comprising from about 2 parts by weight to about 15 parts by weight anhydrous sodium metasilicate granules per 100 parts by weight dry cement, wherein said anhydrous sodium metasilicate granules are isolated from the slurry by an external coating or organic wax.

* * * * *

UNITED STATES PATENT OFFICE
CERTIFICATE OF CORRECTION

PATENT NO. : 4,036,301
DATED : July 19, 1977
INVENTOR(S) : Charles A. Powers; George B. Holman; and Robert C. Smith.

It is certified that error appears in the above-identified patent and that said Letters Patent are hereby corrected as shown below:

Column 2, line 16, "temeprature" should read --temperature--; line 31, "pressure" should read --presence--; line 37, "some" should read --same--; line 39 "assoicated" should read --associated--; line 39 after "process" and before "rapidly" (line 40) insert --proceed--.

Column 3, line 21, after "consistency" and before "at" insert --measured--; line 22, "characteric" should read --characteristic--; line 28, "additives containing lignosulfonate" should read --(additives containing lignosulfonate)--; line 37, "quanity" should read --quantity--; line 39, "temperatue" should read --temperature--; line 42, after "to" and before "15" insert --about--; line 43, "disperesed" should read --dispersed--.

Column 4, line 38, "conditins" should read --conditions--; line 60, "sofening" should read --softening--.

Column 5, line 14, "Warning" should read --Waring--; line 17, after "cement" and before "time" insert --slurry was tested according to the API RP 10B procedure in a thickening time tester--; line 22 "stating" should read --starting--; line 23, "of" should read --to--; line 34 and 35, "encapsulataed" should read --encapsulated--; line 39, "($Na_2SiO_3$)." should read --($Na_2SiO_3$),--; line 47, "Bareco" should read --Bareco®--; line 50, "Elvax" should read --Elvax®--; line 56, "consituted" should read --constituted--; line 63 "accelertor" should read --accelerator--; line 68, "there" should read --three--.

Column 6, line 14, delete "For comparison, a sample of the cement to set in about"; line 15, delete "10 minutes"; line 21, "thichening" should read --thickening--; line 44, after "parts" (first occurrence) and before "by" insert --water per 100 parts--.

Column 7, line 9, insert --*Net weight % of anhydrous sodium metasilicate--; line 16, "has" should read --had--; line 25, "to" should read --of--; line 28, "be" should read --the--; line 50, after "slurry" and before "one" insert --after--; line 56, "has" should read --had--.

Column 8, line 63 and 64, "retared" should read --retarded--; line 66, "pumability" should read --pumpability--.

UNITED STATES PATENT OFFICE
CERTIFICATE OF CORRECTION

PATENT NO. : 4,036,301

DATED : July 19, 1977

INVENTOR(S) : Charles A. Powers; George B. Holman; and Robert C. Smith.

It is certified that error appears in the above-identified patent and that said Letters Patent are hereby corrected as shown below:

Claim 4, column 9, line 23, after "calcium" and before "and" insert --chloride--

Claim 6, column 10 line 1, "moncirculating" should read --noncirculating--.

Claim 11, column 10, line 21, "coated' should read --coating--.

Claim 13, column 10, line 37, "or" should read --of--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*